United States Patent
Chen et al.

(10) Patent No.: US 12,411,111 B2
(45) Date of Patent: Sep. 9, 2025

(54) REFERENCE-FREE LOAD-MODULATED LONGITUDINAL RAIL STRESS MEASUREMENT USING ULTRASONIC LCR WAVES

(71) Applicant: Southwest Research Institute, San Antonio, TX (US)

(72) Inventors: Xin Chen, San Antonio, TX (US); Adam C. Cobb, San Antonio, TX (US); Douglas R. Earnest, San Antonio, TX (US); Keith A. Bartels, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 294 days.

(21) Appl. No.: 18/326,611

(22) Filed: May 31, 2023

(65) Prior Publication Data
US 2023/0393098 A1    Dec. 7, 2023

Related U.S. Application Data

(60) Provisional application No. 63/348,474, filed on Jun. 2, 2022.

(51) Int. Cl.
*G01N 29/07*    (2006.01)
*G01N 29/06*    (2006.01)

(52) U.S. Cl.
CPC .......... *G01N 29/07* (2013.01); *G01N 29/069* (2013.01); *G01N 2291/02827* (2013.01); *G01N 2291/2623* (2013.01)

(58) Field of Classification Search
None
See application file for complete search history.

(56) References Cited

U.S. PATENT DOCUMENTS

| | | | |
|---|---|---|---|
| 6,502,463 B1 * | 1/2003 | Clark | G01L 1/12 73/597 |
| 11,619,132 B2 * | 4/2023 | Sun | E21D 21/02 702/42 |

* cited by examiner

*Primary Examiner* — Suman K Nath
(74) *Attorney, Agent, or Firm* — Livingston Law Firm

(57) ABSTRACT

A method of in situ measurement of an acoustoelastic constant (L) of a railway rail, using an ultrasonic wedge sensor to measure a stress-free (unloaded) time-of-flight ($t_0$) in the vertical direction of the rail. Next, a vertical load of known load value is applied to the rail. While the vertical load is applied, the ultrasonic wedge sensor is used to measure a stressed time-of-flight value. The difference between the stress-free and the stressed time-of-flight is calculated to obtain a time-of-flight difference value ($\Delta t$). Based on the load value, the stress-free time-of-flight value, and the time-of-flight difference value, the acoustoelastic constant, L, may be calculated. The wedge sensor may be further used to measure the (stressed) horizontal time of flight, and a time-of-flight difference value in the horizontal direction may be used to measure longitudinal stress.

16 Claims, 16 Drawing Sheets

| DATA SET # | LOAD DIRECTION | LOAD CHANGE | WEDGE DIRECTION | WEDGE POSITION |
|---|---|---|---|---|
| 1 | VERTICAL | 0 TO 250 kips | VERTICAL | WEB CENTER, STRAIN GAUGE SIDE |
| 2 | VERTICAL | 250 TO 0 kips | VERTICAL | WEB CENTER, STRAIN GAUGE SIDE |
| 3 | VERTICAL | 0 TO 250 kips | VERTICAL | WEB CENTER, NON-STRAIN GAUGE SIDE |
| 4 | VERTICAL | 250 TO 0 kips | VERTICAL | WEB CENTER, NON-STRAIN GAUGE SIDE |
| 5 | LONGITUDINAL | 0 TO 193 kips | LONGITUDINAL | WEB CENTER, STRAIN GAUGE SIDE |
| 6 | LONGITUDINAL | 193 TO 0 kips | LONGITUDINAL | WEB CENTER, STRAIN GAUGE SIDE |
| 7 | LONGITUDINAL | 0 TO 193 kips | LONGITUDINAL | WEB CENTER, NON-STRAIN GAUGE SIDE |
| 8 | LONGITUDINAL | 193 TO 0 kips | LONGITUDINAL | WEB CENTER, NON-STRAIN GAUGE SIDE |
| 9 | LONGITUDINAL | 0 TO 193 kips | VERTICAL | WEB CENTER, STRAIN GAUGE SIDE |
| 10 | LONGITUDINAL | 193 TO 0 kips | VERTICAL | WEB CENTER, STRAIN GAUGE SIDE |
| 11 | LONGITUDINAL | 0 TO 193 kips | VERTICAL | WEB CENTER, NON-STRAIN GAUGE SIDE |
| 12 | LONGITUDINAL | 193 TO 0 kips | VERTICAL | WEB CENTER, NON-STRAIN GAUGE SIDE |
| 13 | LONGITUDINAL | 0 TO 193 kips | VERTICAL | FOOT CENTER, STRAIN GAUGE SIDE |
| 14 | LONGITUDINAL | 193 TO 0 kips | VERTICAL | FOOT CENTER, STRAIN GAUGE SIDE |

FIG. 8

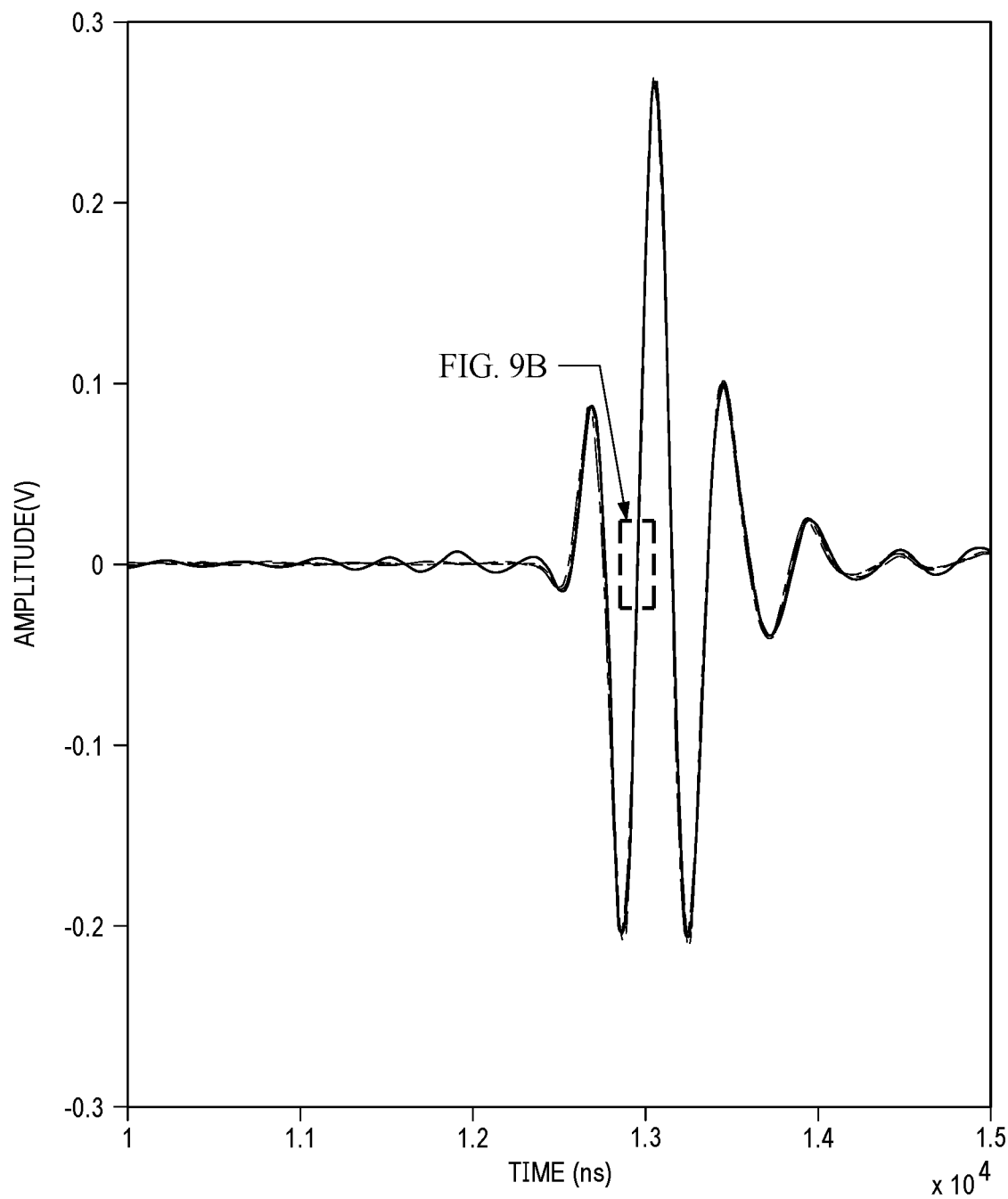

REFERENCE-FREE LOAD-MODULATED LONGITUDINAL RAIL STRESS MEASUREMENT USING ULTRASONIC LCR WAVES

TECHNICAL FIELD OF THE INVENTION

This patent application relates to non-destructive stress measurement techniques, and more particularly to such techniques applied to measuring longitudinal stress in railroad rails.

BENEFIT OF PROVISIONAL FILING DATE

This patent application claims the benefit of the filing date of App. No. 63/348,474, filed Jun. 2, 2022, entitled "Reference-Free Load-Modulated Longitudinal Rail Stress Measurement Using Ultrasonic LCR Waves".

BACKGROUND OF THE INVENTION

Longitudinal stress within railroad rails is a significant maintenance issue. High compression forces brought on by high ambient temperatures can cause the rails to buckle. Furthermore, tensile stresses brought on by low temperatures can lead to cracking. As a result, the railroad industry has long sought a practical non-destructive testing technique for measuring longitudinal stress within railroad rails in the field.

Among various existing non-destructive rail stress measurement techniques, ultrasonic approaches have gained interest due to their efficiency and moderate cost. The fundamental principle of an ultrasonic approach is the acoustoelastic effect, which is the correlation between acoustic properties, such as wave velocity and polarization, and the stress state of a solid body.

One ultrasonic stress measurement method is the ultrasonic birefringence approach, which requires measuring the velocity of two shear waves polarized in different directions when propagating through the rail material thickness. Despite the measurement simplicity of this method, its sensitivity to stress is small compared to other methods.

Ultrasonic stress measurements based on Rayleigh waves, which are surface following waves, have also been investigated. For this method, in-plane and out-of-plane wave displacements are measured separately and their ratio is related to the stress state of the material. The sensitivity of this polarization-based approach is theoretically the largest of all acoustic wave mode options. Experimental results presented in literature are promising, but the generation and reception of Rayleigh waves uses laser-based sensors, which is appropriate in a laboratory setting but is challenging and imposes technical and safety risks in a field setting.

Another ultrasonic stress measurement method with comparable sensitivity to the Rayleigh-based approach is based on longitudinal critically refracted (LCR) wave propagation. LCR waves are longitudinal waves that are refracted to propagate parallel to the entry surface. Stress measurement is based on the time required for the wave to propagate a fixed distance. An advantage of this method over others is that LCR waves are relatively easy to produce, using a simple ultrasonic wedge to angle transducers to produce the required refraction of the ultrasonic wave.

A limitation that prevents the above-mentioned methods from successful field application is the requirement of prior knowledge about material constants or significant calibration. Designing a method to measure stress, without knowing third-order acoustoelastic constants, has long been a goal.

BRIEF DESCRIPTION OF THE DRAWINGS

FIG. 8 summarizes the datasets for the wedge and loading directions of FIGS. 6 and 7.

FIG. 9A illustrates waveforms acquired at different load levels, with the wedge sensor positioned along the same direction as the vertical load.

SPECIFICATION

The following description is directed to an ultrasonic approach for measuring the longitudinal stress state in railroad rails based on longitudinal critically refracted (LCR) wave propagation. Longitudinal rail stress is measured in-situ and without prior knowledge from a reference.

The fundamental concept is to obtain an acoustoelastic constant in the rail's vertical direction, where the stress is easy to be manipulated in field. The obtained constant is then used to estimate stress along the other direction, i.e., longitudinally. In this way, the requirement of prior knowledge about the rail material constants or significant calibration can be minimized.

Figure 1:
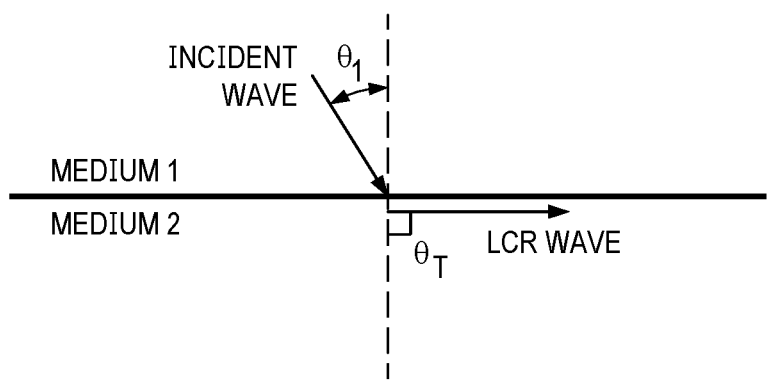
FIG. 1 illustrates basic geometry for longitudinal critically refracted (LCR) wave generation.

FIG. 1 illustrates basic geometry for longitudinal critically refracted (LCR) wave generation. In infinite, isotropic solids, two types of ultrasonic wave modes can exist, namely longitudinal waves (also known as pressure waves, or P-waves) and transverse waves (also known as shear waves, or S-waves). Both are bulk elastic waves. When these waves propagate between two different media, their velocity changes. To match the incident and transmitted wave at the boundary, the transmitted wave will change its direction of propagation. The relationship between the angles and wave velocities is given by Snell's Law:

$$\frac{\sin(\theta_I)}{V_I} = \frac{\sin(\theta_T)}{V_T}, \quad (1)$$

where $\theta_I$ and $V_I$ are the incident angle and wave velocity in one medium, respectively, and $\theta_T$ and $V_T$ are the transmitted angle and wave velocity in the other medium. As the incident angle increases when propagating from a slower to a faster medium, relative to normal, the transmitted angle in the second medium approaches 90 degrees, an LCR wave is formed, and that incident angle is referred as the first critical angle.

As introduced in the Background, LCR wave stress measurement is based on the relation of wave velocity with stress, referred to as acoustoelasticity. This relation can be summarized in the following equation:

$$\Delta\sigma = \frac{E(\Delta V/V)}{L}, \quad (2)$$

where $\Delta\sigma$ is the stress change, E is the elastic modulus, $\Delta V$ is the wave velocity change, V is the longitudinal wave velocity, and L is an acoustoelastic constant.

A commonly used device for LCR wave measurement is an ultrasonic wedge sensor, which contains angled transducers to produce the required refraction of the ultrasonic wave. Using the distance between a transmitter and receiver in the wedge, Equation (2) can be rewritten as:

$$\Delta\sigma = \frac{E}{L}\left(\frac{t-t_0}{t_0}\right) = \frac{E}{L}\left(\frac{\Delta t}{t_0}\right), \quad (3)$$

where t0 is the time-of-flight (ToF) under a stress-free condition, and $\Delta t$ is the ToF change due to stress.

Stress change can be converted to strain change ($\Delta\varepsilon$) as:

$$\Delta\varepsilon = \frac{\Delta\sigma}{E} = \frac{1}{Lt_0}\Delta t = k\Delta t \quad (4)$$

From Equations (2)-(4), to estimate longitudinal stress in a rail, the acoustoelastic constant (L), the stress-free LCR wave ToF ($t_0$), and the ToF change due to stress ($\Delta t$) along the longitudinal direction are needed.

The method described herein uses a load-modulation concept along the rail's vertical direction. The assumption is that vertical rail stress is small without train loading and the stress change with rail temperature is significantly smaller compared to that of the longitudinal stress because the thermal expansion is not limited in the vertical direction. With this assumption, the acoustoelastic constant (L) can be obtained in-situ by introducing load along the rail's vertical direction and measuring the ToF of LCR waves propagating a fixed distance vertically.

The stress-free LCR wave ToF ($t_0$) along the vertical direction can be obtained if the longitudinal stress does not change it significantly, and thus be used to estimate the k coefficient in Equation (4) for the longitudinal direction. This is based on the fact that any differences in $t_0$ between the two directions are negligible, considering the ToF of LCR wave propagation within the rail is much larger.

To obtain LCR wave ToF change ($\Delta t$) as a result of stress, based on the above assumption, the method described herein obtains this value by subtracting the stress-free ToF along the vertical direction from measured ToF along the longitudinal direction. Note that different from comparing the t0 along the two directions, the Lt is within several tens of nanoseconds at most given rail height limitation. Any subtle variations of couplant, surface condition, local material texture, or residual stress may have significant impacts, therefore, it is challenging to precisely measure $\Delta t$. By carefully selecting transducer frequency, measurement locations, and wedge design, measurement efficacy can be improved.

Figure 2:
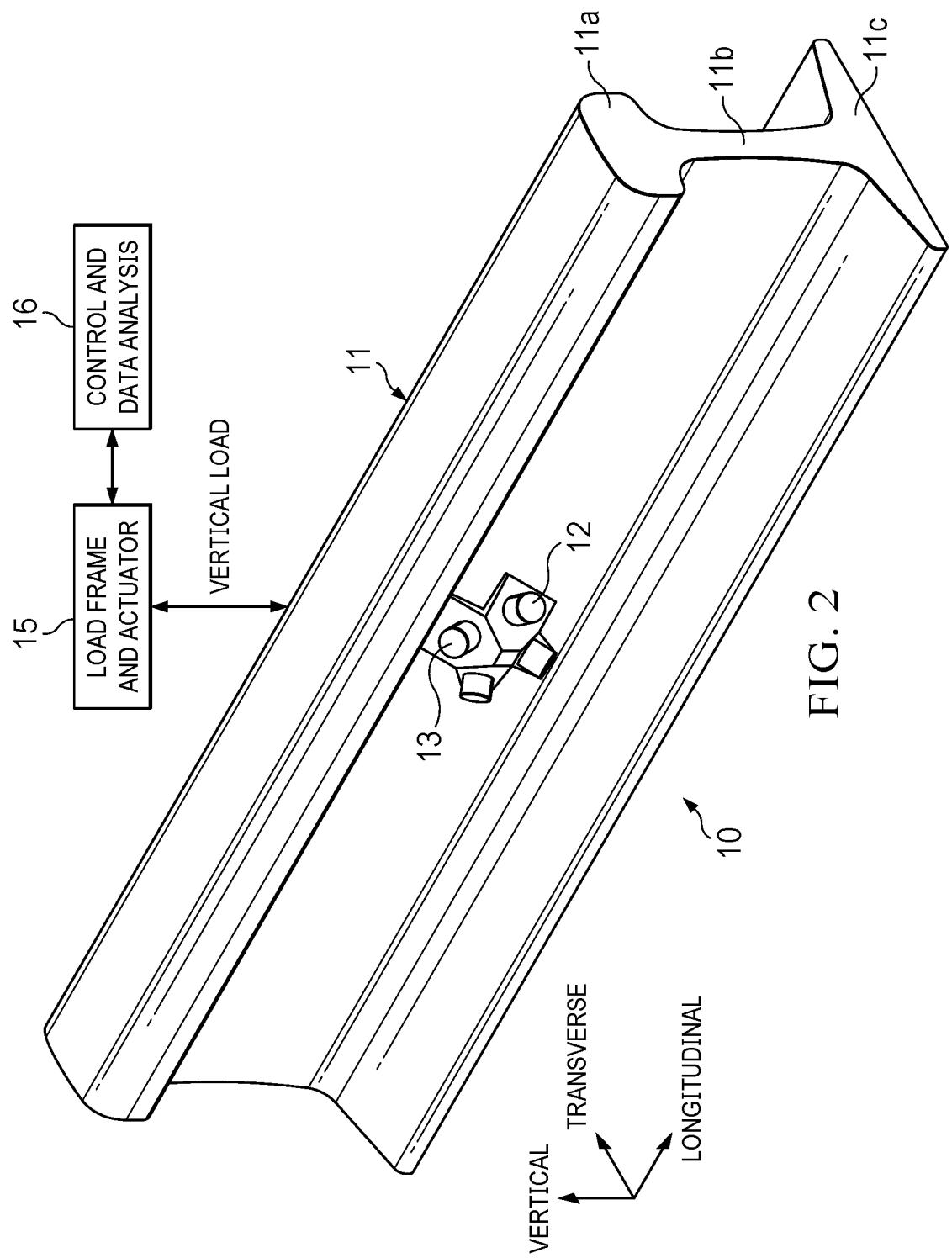
FIG. 2 illustrates one embodiment of an LCR rail stress measurement system in use for testing a rail.

FIG. 2 illustrates one embodiment of an LCR rail stress measurement system 10 in use for testing a rail 11. Rail 11 is a flat-bottom type rail, which is the dominant rail profile in worldwide use. Rail 11 has a head 11a, web 11b, and foot 11c.

In the example of FIG. 2, system 10 has two wedge-sensors 12 and 13 placed on rail web 11b. A first wedge-sensor 12 is along the longitudinal direction for longitudinal ToF measurements. A second wedge-sensor 13 is along the vertical direction for vertical ToF measurements.

In other embodiments, a single wedge sensor could be used and rotated 90 degrees for vertical and horizontal measurements. Also, for horizontal ToF measurements it may be preferred to place the wedge sensor on the rail foot.

Each wedge sensor 12 or 13 has at least one transmitter and one receiver that operate in a pitch-catch configuration to measure time-of-flight (ToF) from a signal refracted by the rail material. An example of a suitable wedge-sensor is described below and is used for purposes of example in this description.

In other embodiments of system 10, each stress direction may be measured with wedge-sensors having more than one transmitter and/or more than one receiver. Each transmitter may receive signals from more than one receiver. For purposes of this description, an "ultrasonic wedge sensor" includes various ultrasonic wedge sensors with angled transducers that produce the required refraction of an ultrasonic wave for acquiring ToF measurements in a railway rail.

The measurement system 10 further has a controllable load frame and actuator 15. During stress measurements, it applies a known vertical load to the rail. Typically, the range of load values are below the yield stress of the material but as large as possible to maximize the ToF change.

A control and data analysis unit 16 controls the actuator 15. It generates, delivers, and receives ultrasonic signals from the wedge-sensors 12 and 13. It performs the calculations described herein to provide an acoustoelastic constant and/or a longitudinal stress measurement.

For measuring the acoustoelastic constant (L), the following steps are performed: (1) A vertical wedge-sensor is used to measure a stress-free (unloaded) time-of-flight ($t_0$). (2) A vertical load of known value is applied to the rail. (3) The stressed ToF is measured using the same vertical wedge-sensor. (4) The difference between the stress-free and the stressed ToF is calculated to obtain a ToF difference value ($\Delta t$). (5) Based on the load value, the stress-free ToF value, and the ToF difference value, the acoustoelastic constant, L, can now be calculated using Equations (1)-(4) above.

Given the acoustoelastic constant (L), a ToF measurement in the longitudinal direction may then be made. A second horizontally placed wedge-sensor as shown in FIG. 2 may be used. Alternatively, a single wedge-sensor could be used and rotated ninety degrees. Longitudinal stress can now be calculated using the horizontal (longitudinal) ToF measurement to obtain the ToF difference value.

Transducer Frequency

Transducer center frequency determines the LCR wave propagation depth. A lower frequency penetrates deeper into the material. A deeper propagation path is less sensitive to surface conditions and rolling-introduced texture. Another advantage of lower frequencies is that they tend to generate lower longitudinal velocities in pearlite steel and thus larger ToF differences within the fixed wave propagation distance.

However, lower frequency transducers are larger in size which can also reduce the wave propagation distance given the limited height of rail web.

To implement wedge-sensors 12 and 13, an example of a suitable center frequency is 2.25 MHz with a 0.25-inch diameter crystal.

Measurement Locations

The measurements for the acoustoelastic constant (L or k) are on the surface of rail web 11$b$ to respond to the vertical load change. The measurements for the ToF difference ($\Delta$t) between the two directions are preferred on the upper surface of the rail foot 11$c$. Because of the cold-rolling process, the upper surface of the rail foot 11$c$, the lower surface of rail head 11$a$, as well as the two connections of the foot and the head along the rail web 11$b$ are less cold-worked, which not only generates less texture variations but less residual stresses. In addition, the upper surface of rail foot 11$c$ is the flattest among those considered locations.

Wedge-Sensor Design

Figure 3:
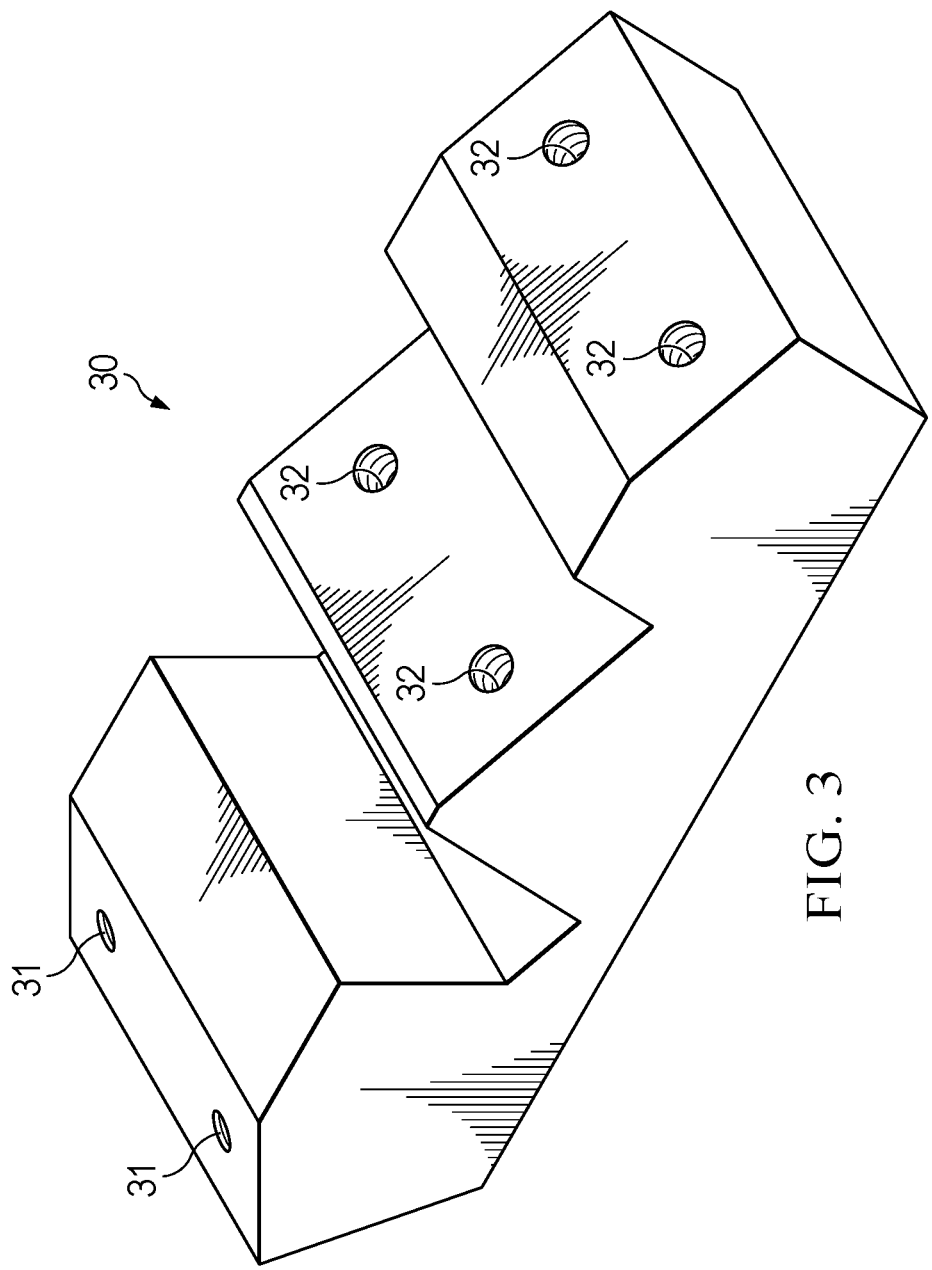
FIG. 3 is a perspective view of one embodiment of an ultrasonic wedge-sensor for use with the measurement system of FIG. 2.
Figure 4:
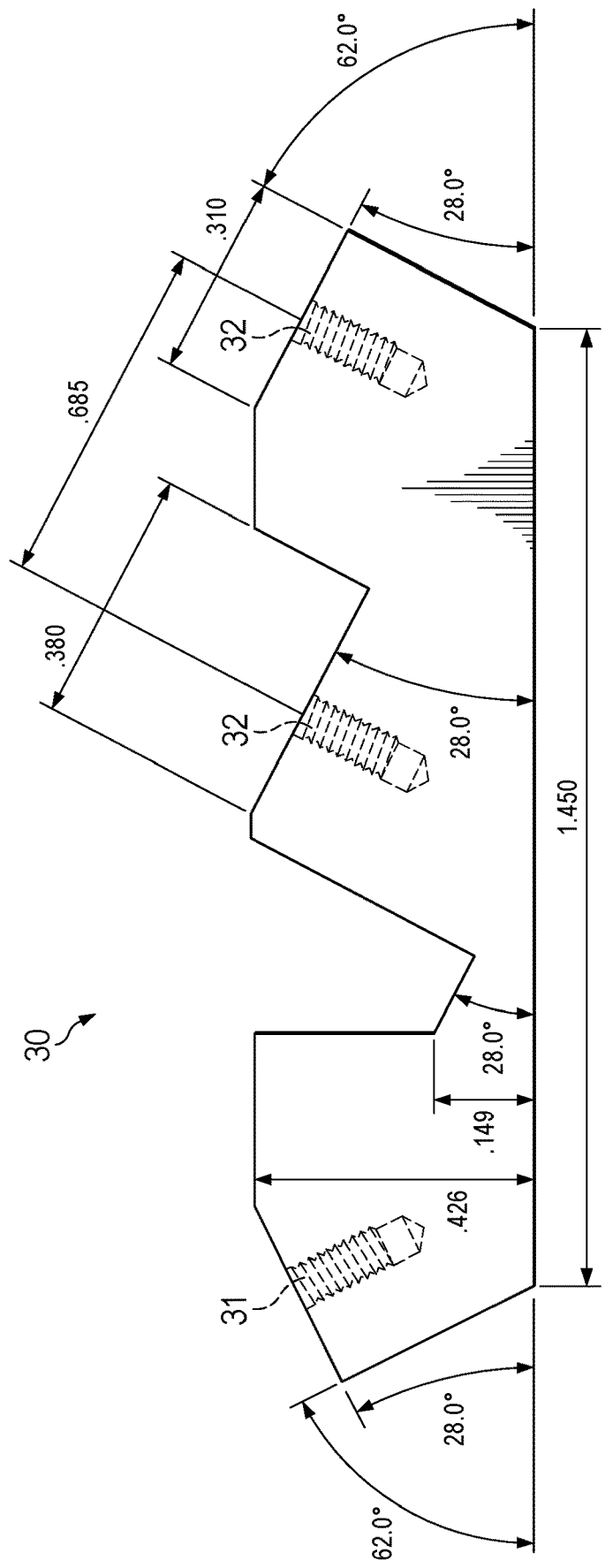
FIG. 4 is a cross-sectional view of the wedge sensor of FIG. 3.

FIGS. 3 and 4 illustrate one embodiment of an ultrasonic wedge-sensor 30 for use with measurement system 10. FIG. 3 is a perspective view and FIG. 4 is a cross-sectional view.

Wedge-sensor 30 has a transducer group with two transmitters 31 and two receivers 32 for each transmitter. However, wedge 30 may be implemented with transducer groups having other numbers of transmitters and receivers.

Wedge sensor 30 may be used for measuring both longitudinal and vertical stresses. Wedge 30 holds one transducer group but may be rotated to measure stress along the other direction. This is preferable to using a single wedge device containing transducer groups for both directions because wave path differences inside the wedge are eliminated. Effects of possible couplant variations on ToF measurements can be addressed.

Other design features of wedge sensor 30 are its length and its bottom flatness. A longer wedge provides larger wave propagation distance on the rail web but is more prone to couplant variations if a flat bottom is used. A longer wedge also increases the possibility of the transmitter and receiver being positioned on surfaces with different roughness. Wedges with a bottom that fits the vertical curvature of the rail web can reduce the impact from couplant variations, but this also makes them not appropriate for surfaces with different curvatures.

As shown in FIG. 4, considering the dimensions of the rail foot 11$c$, wedge 30 is implemented with a flat bottom having a 1.45-inch bottom length for holding one transmitter and two receivers. The distance between the transmitter and the second receiver is 1.1 inches and the distance between the two receivers is 0.6 inch. The incident angle is 28 degrees using the nominal longitudinal wave velocities in rail steel and wedge material. A suitable wedge material is acrylic glass.

Experimentation and Proof of Concept

Figure 5:
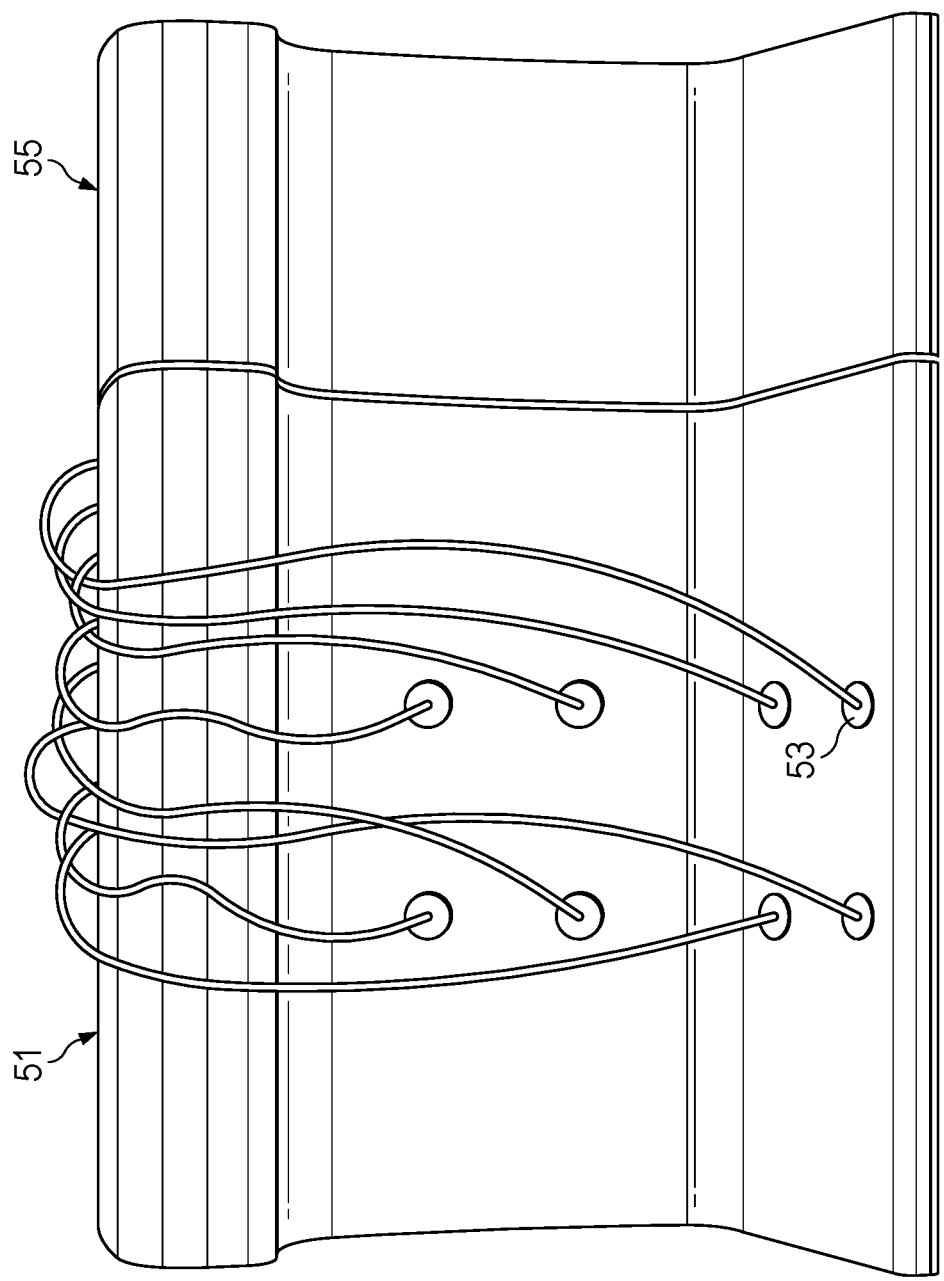
FIG. 5 illustrates two rail samples used for experimentation and proof of concept.

FIG. 5 illustrates two rail samples used for experimentation and proof of concept. The samples were pieces of conventional 136-pound rail. A first sample 51 is 8 inches in length with its top, bottom, left, and right surfaces machined for load tests. One side along its thickness direction was cleaned with a carbon steel wire brush to remove rust. The other side was sanded finer with an abrasive wheel for strain gauge installation, as shown.

Eight strain gauges 53 were installed, among which four were on the web area and the other four were on the top surface of the foot area. At each area, two strain gauges measure the vertical stains and the other two measure the longitudinal strains.

The second sample 55 is 3.5 inches in length and in its raw condition. This sample is mainly used to evaluate the effect of surface conditions on stress-free LCR wave ToF changes; i.e., no load test was conducted on it.

Figure 6:
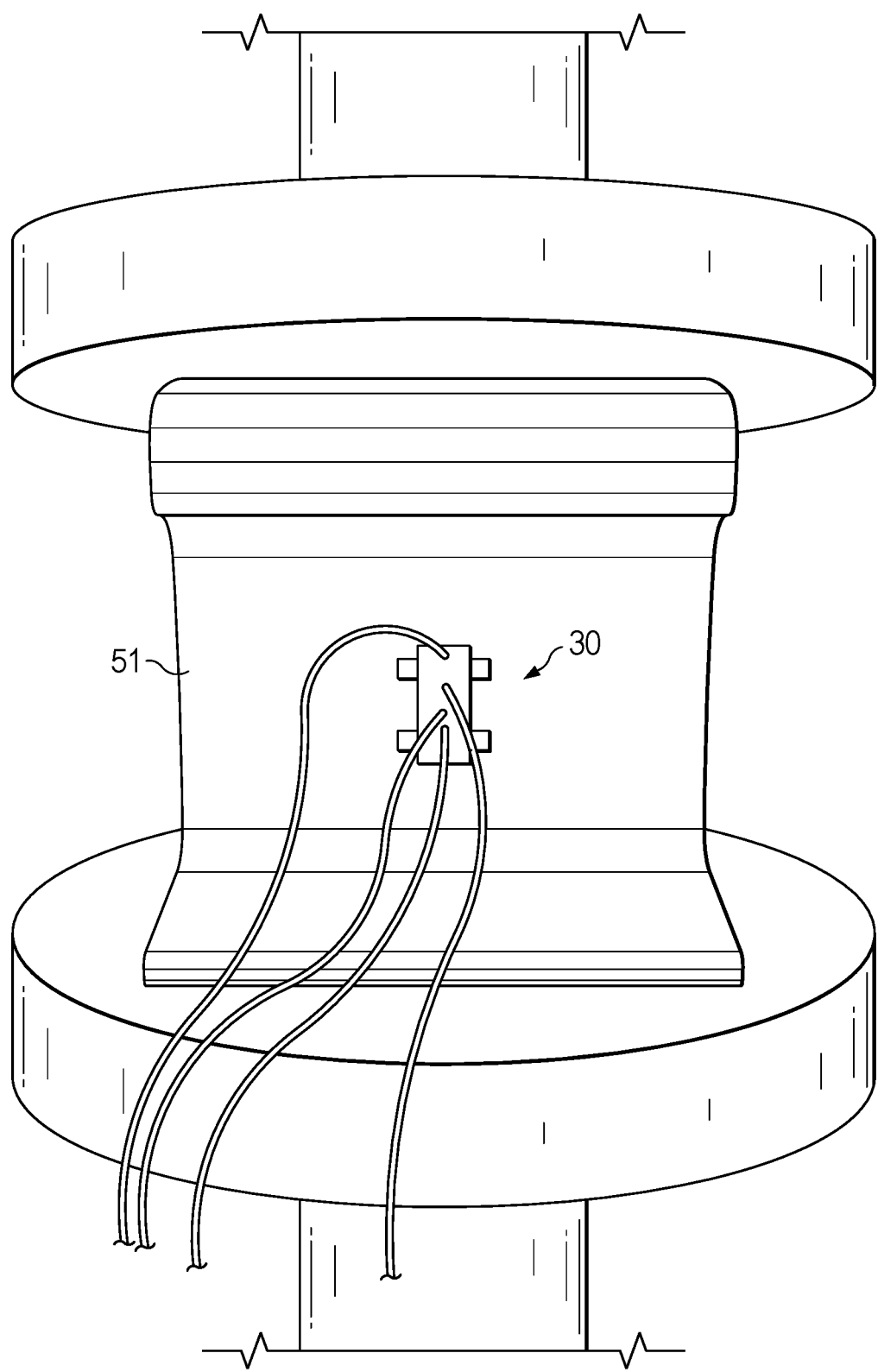
FIGS. 6 and 7 illustrate a rail sample positioned between the two loading plates of a servo-hydraulic test machine to apply vertical and horizontal loading, respectively, for proof-of-concept testing.
Figure 7:
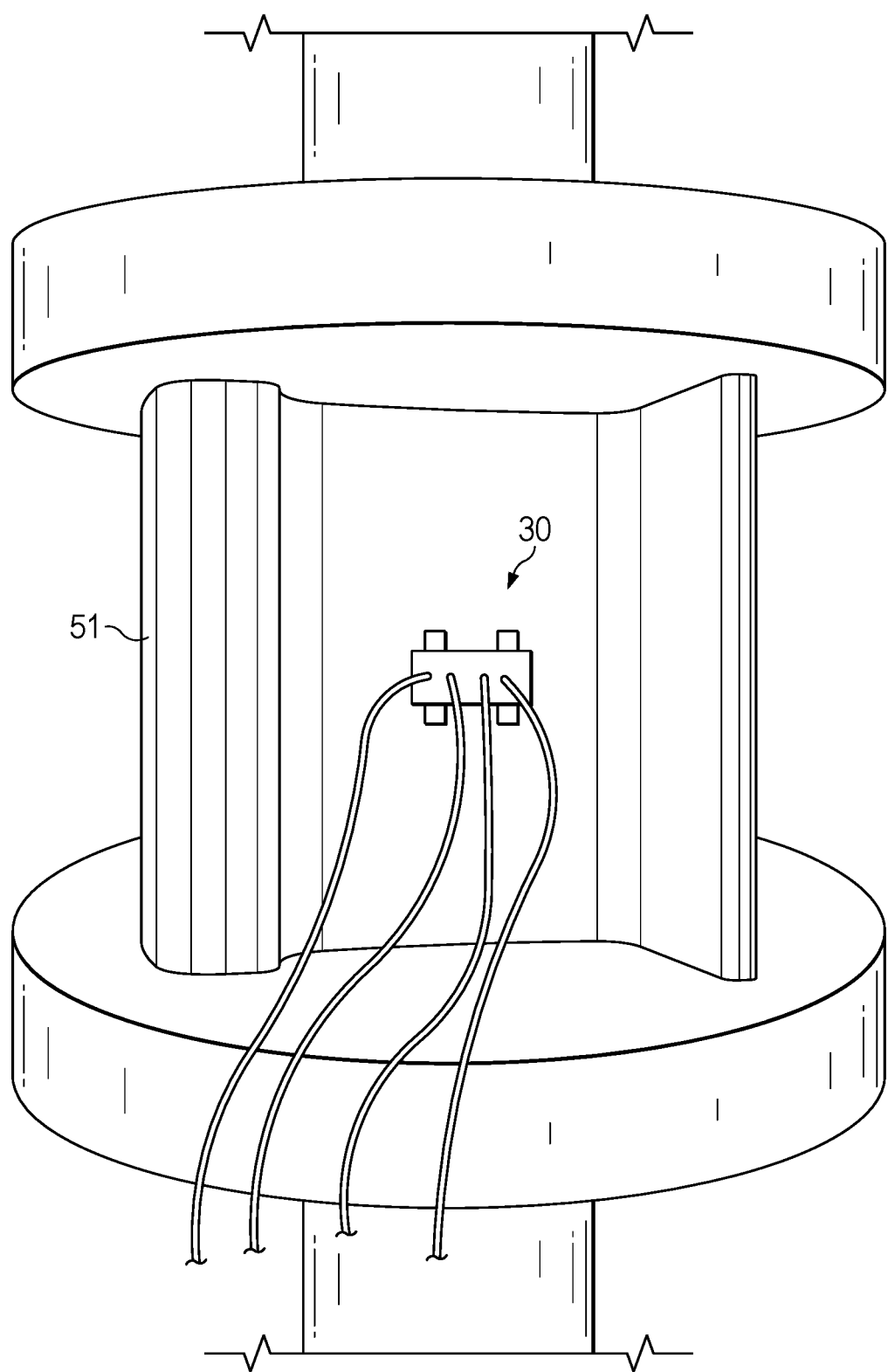

FIGS. 6 and 7 illustrate the 8-inch-long rail sample 51 positioned between the two loading plates of a servo-hydraulic test machine running in load control mode. Vertical loading (FIG. 6) and longitudinal loading (FIG. 7) were applied by rotating the rail sample 90 degrees.

Ultrasonic wedge 30 was attached to sample 51 using a fixture, which encloses four small magnets to improve positioning stability.

The maximum load of the test machine was 200 kips, which translates into 250 MPa along the vertical direction using the narrowest rail width (11/16 inch) and approximately 100 MPa along the longitudinal direction using the cross-section area. Therefore, the vertical loading was designed to increase from 0 kips (0 MPa) to 200 kips (250 MPa) at a step of 20 kips (25 MPa), and the longitudinal loading from 0 kips (0 MPa) to 193.2 kips (100 MPa) at a step of 48.3 kips (25 MPa).

A Scientific Instruments UT340 pulser-receiver (not shown) was used to generate a 40 ns long and 200 V impulse and to acquire the response of the first (nearest) receiver 32 of wedge 30. The response of the second (farther) receiver 32 was acquired by a Panametrics 5072PR pulser-receiver (not shown). Both received signals were sampled at a frequency of 5 GHz by a Tektronix MSO4140B oscilloscope. For each acquisition, 512 waveforms were averaged to improve the signal-to-noise ratio. Strain gauge readings were also recorded.

Center positions along the rail web and the foot top surface of both rail sides were selected to conduct the load tests, because of their vicinity to the installed strain gauges.

FIG. 8 summarizes the datasets for the wedge and loading directions. These datasets are identified as Data Sets #1-#14.

Stress-free wave ToF measurements were mainly conducted with the wedges 30 placed on the top surface of the rail foot. Three locations with a spacing of 2 inches from each other on both sides of the 8-inch-long sample and on the center on both sides of the 3.5-inch-long sample were selected for testing. The data sets are identified herein as Data Sets #15-#23.

In addition, data from three positions at the bottom of the eight-inch-long rail foot, which was machined to obtain a nearly reflective surface, were recorded for comparison. These data sets are identified herein as Data Sets #24-#26. Another two tests on repeatability were conducted by measuring the longitudinal stress-free wave ToF 10 times on the non-strain gauge side and rail bottom, respectively. These data sets are identified herein as Data Sets #27 and #28.

Proof of Concept Results—Acoustoelastic Constants Along Both Directions

FIG. 9A illustrates the waveforms acquired using the second receiver 32 of wedge 30, at different load levels, when wedge 30 was positioned along the same direction as the vertical load (Data Set #1). The reason to use only the second receiver 32 instead of both receivers is mainly to take advantage of its longer wave propagation distance, which in turn generates larger ToF changes.

Figure 9B:
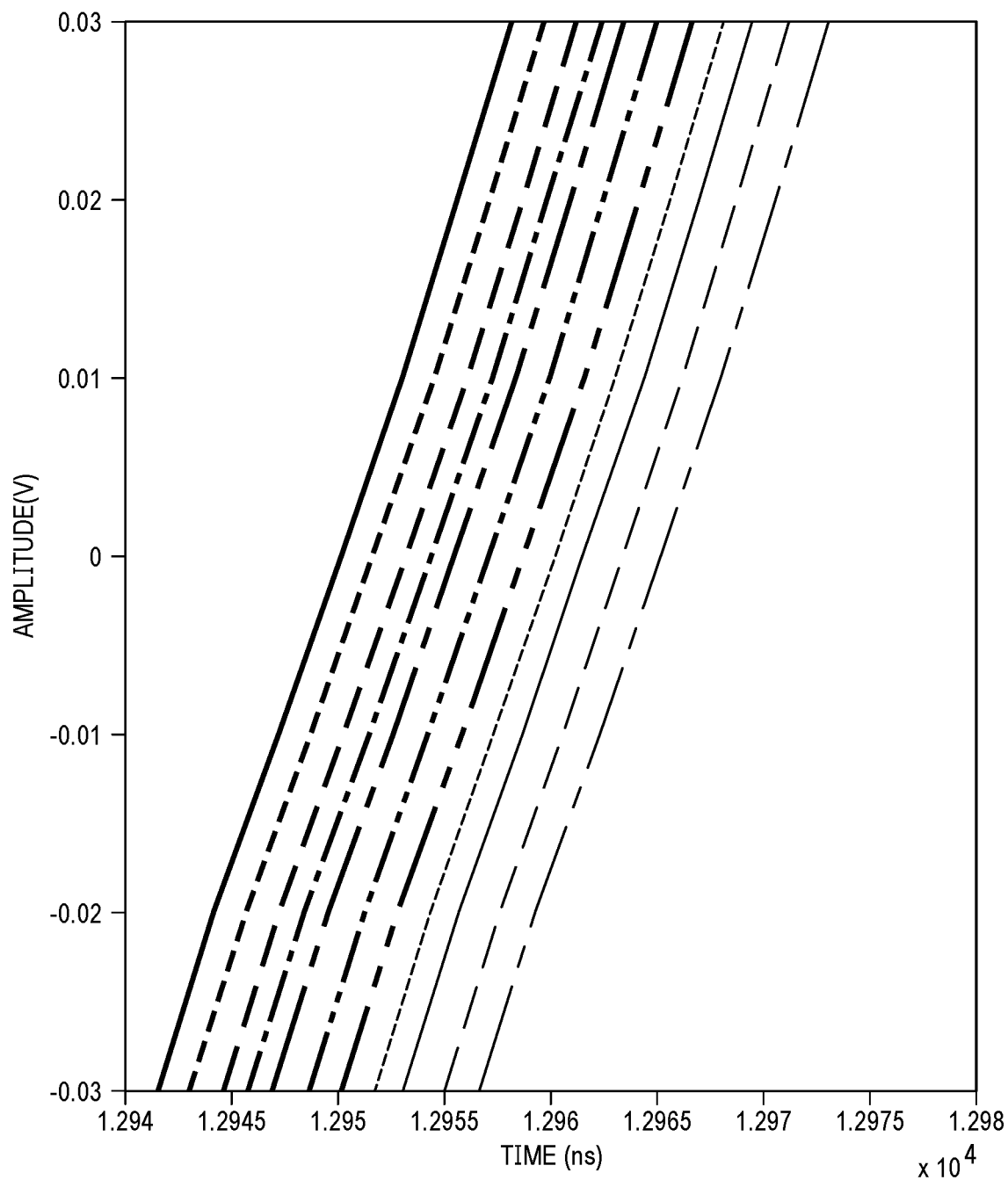
FIG. 9B illustrates a zoomed-in plot from FIG. 9A.

FIG. 9B illustrates a zoomed-in plot from FIG. 9A, where ToF shifts can be clearly observed as the vertical load increased from 0 to 250 MPa.

Figure 10:
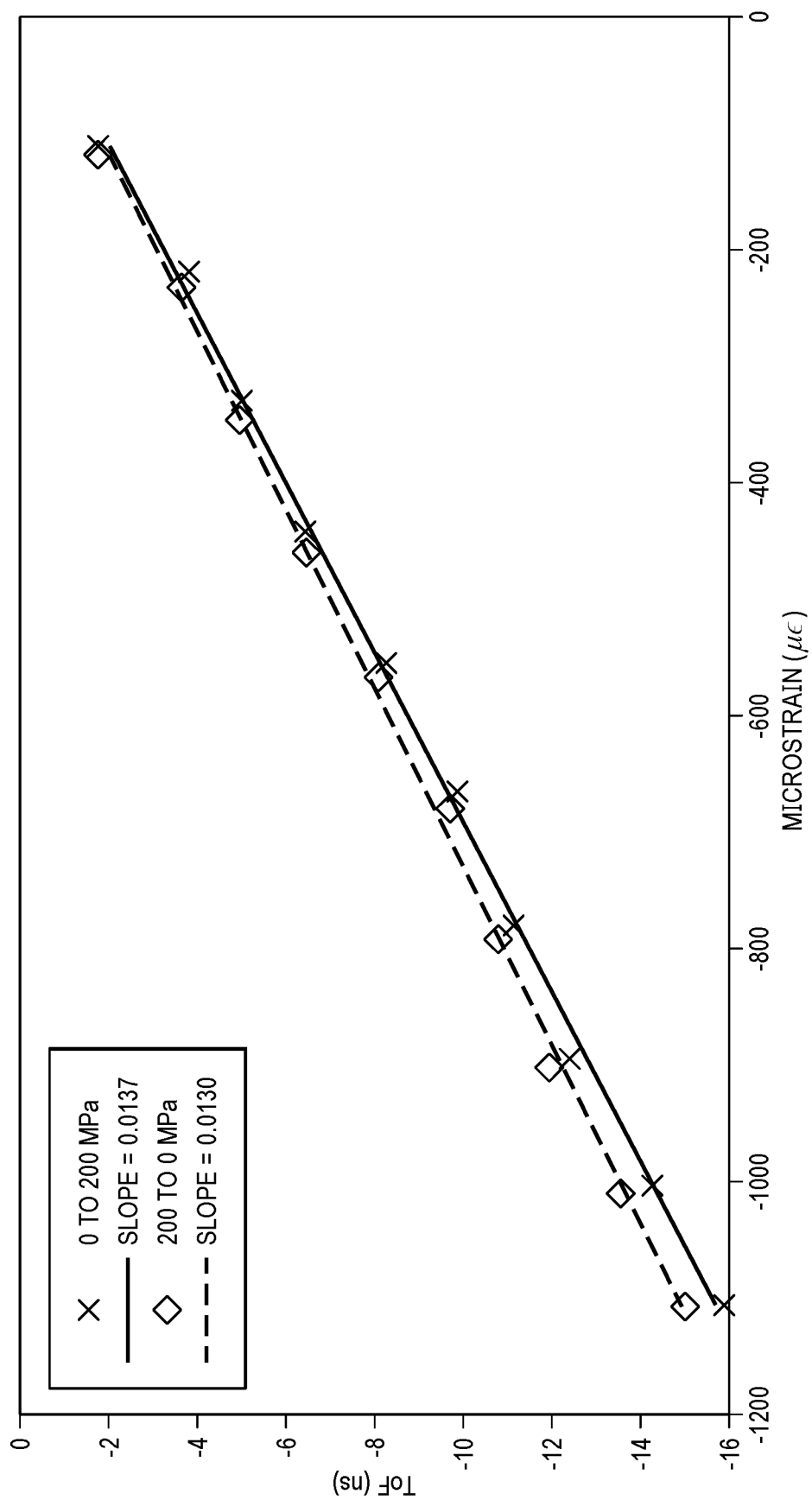
FIG. 10 illustrates stress introduced ToF changes as a function of strain for proof of concept.

FIG. 10 illustrates stress-introduced ToF changes (Data Sets #1 and #2) as a function of strain. The ToFs under each load were further extracted from its waveform using a zero-crossing technique. For Data Set #1 (lower plot), load introduced ToF changes were obtained by subtracting the ToF under 0 MPa load from each higher load level and plotted with respect to the strain changes. As expected, compressive stress increases the wave velocity and therefore reduces the ToF. A linear relationship can be drawn from these points and a fitting curve with a slope of 0.0137 ns/µε is also plotted. For Data Set #2 (upper plot), the setup was the same as for Data Set #1 but with deceasing load. Differences are small (less than 1 ns) by comparing the two data sets, but they are more noticeable under higher load levels (>1000µε or 200 MPa). Given that the time to take each data set while recording strain gauge readings can be as long as 5 mins, it is possible that the couplant might have changed; therefore, the subtraction of ToF at 0 MPa affects higher load levels more. In practice, where no strain gauge readings are needed, the data acquisition time can be much smaller, which may reduce these discrepancies. Another possible reason might be the material responding to load changes differently, which can be further investigated.

Figure 11:
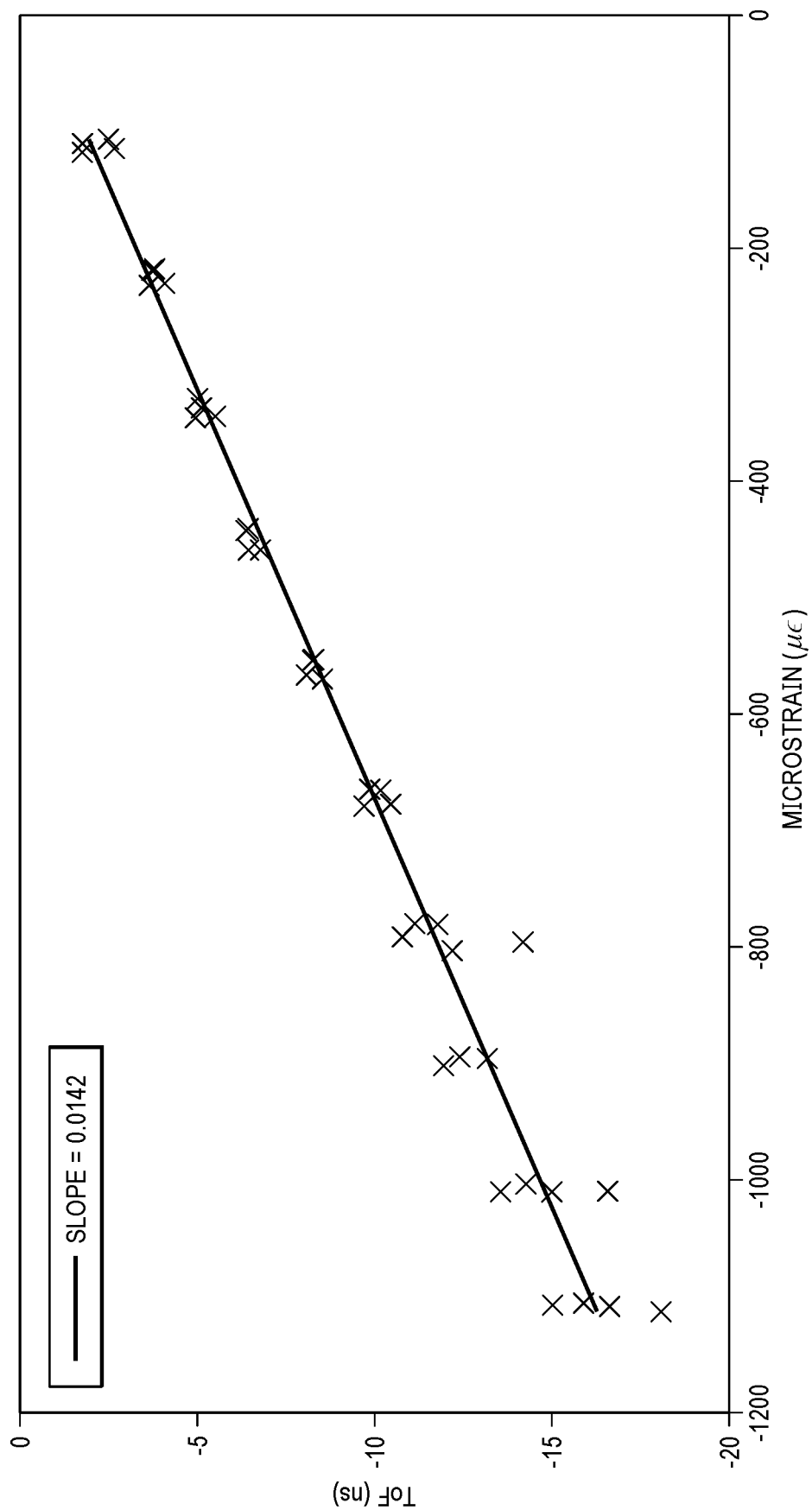
FIGS. 11 and 12 illustrate stress introduced ToF changes as a function of strain, from all data sets taken at different locations when the wedge was positioned along the same direction as the vertical and longitudinal load, respectively.
Figure 12:
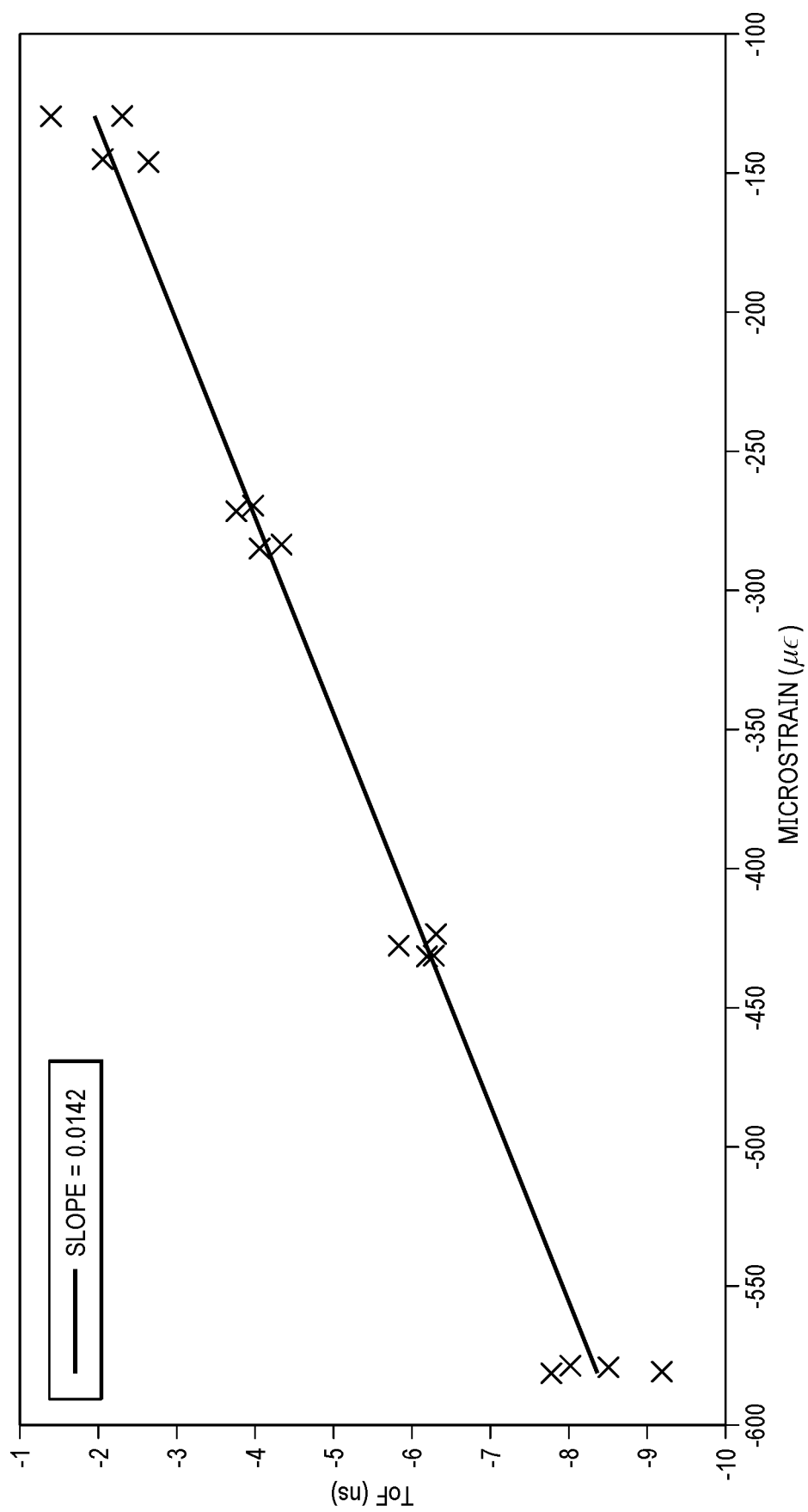

FIGS. 11 and 12 illustrate ToF changes as a function of strain, from all data sets taken at different locations when the wedge 30 was positioned along the same direction as the vertical and longitudinal load, respectively. The slopes of two figures are almost identical, which proves the assumption that the acoustoelastic constant along the rail vertical direction is close to that along the longitudinal direction, and can be used to estimate the longitudinal stress.

Figure 13:
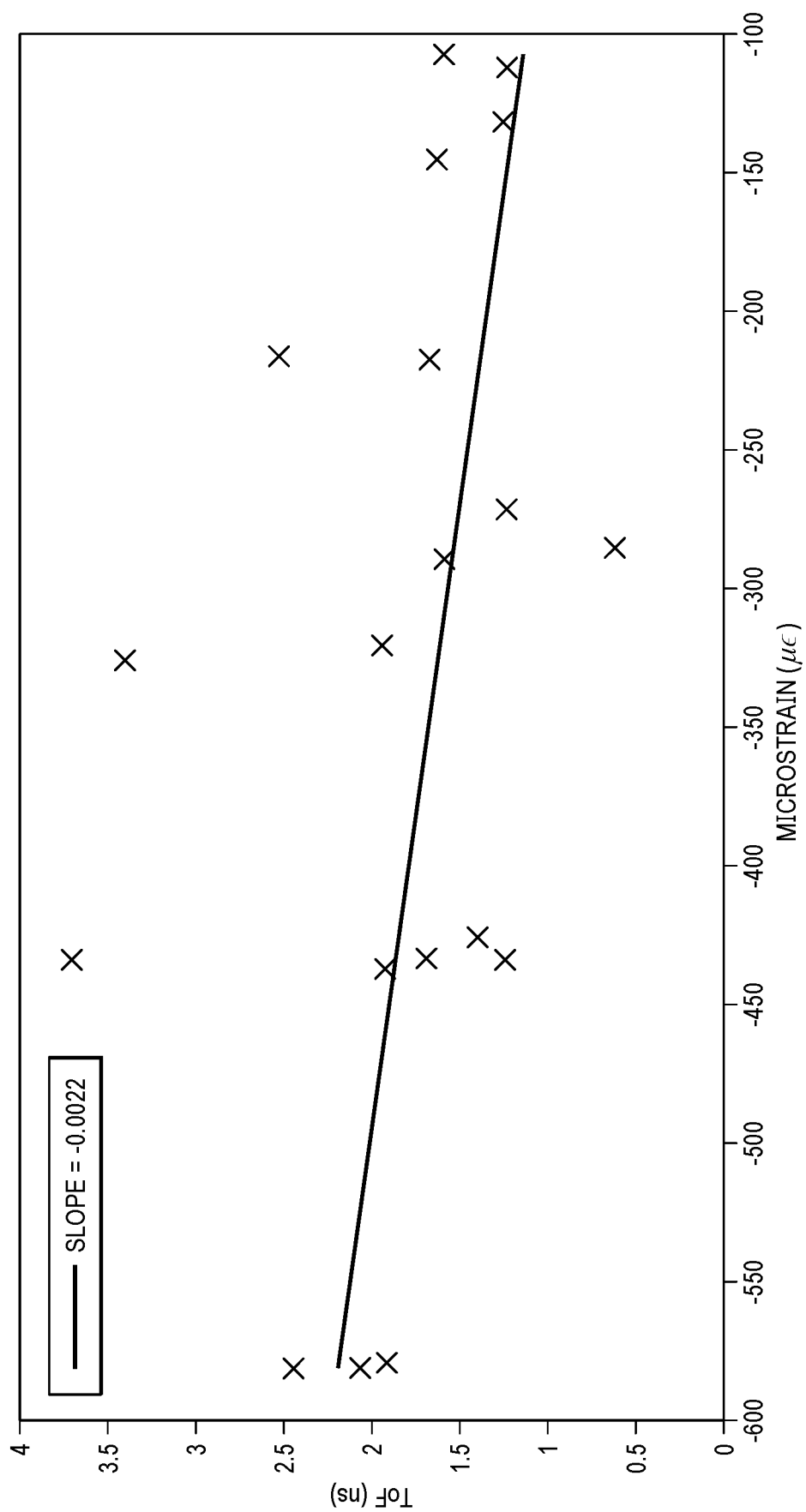
FIG. 13 illustrates ToF changes as a function of strain, taken from all data sets at different locations when the wedge was positioned vertically but the load was longitudinally added.

Proof of Concept Results—Effects of Longitudinal Stress on Vertical Wave Velocity FIG. 13 illustrates ToF changes as a function of strain, taken from all data sets at different locations when the wedge was positioned vertically but the load was longitudinally added. The ToF increases with load, which is as expected due to the Poisson effect. Most ToF changes are within 1 ns up to 100 MPa (~600µε) and the absolute value of the slope is 15% of that when the wedge was positioned along the same direction as load. This result proves the assumption that the LCR wave velocity along the rail vertical direction is minimally affected by the longitudinal load.

Stress-Free ToF Comparison Between Two Directions—Repeatability Results

Repeatability tests were conducted using responses from both two receivers 32 with the aim to compensate possible ToF changes resulting from couplant and surface variations. A first testing location was selected to be the upper surface of the first rail sample foot and the measurement was along the longitudinal direction. A second location was at the center of the rail bottom and the measurement was along the vertical direction. A standard deviation of 1.0 ns was achieved with wedge 30 placed on the rail bottom, which translates into ~20 MPa as if it were introduced by stress. The standard deviation of ToF measurements is bigger (1.4 ns) on the rail foot, mostly due to the rougher surface.

Figure 14A:
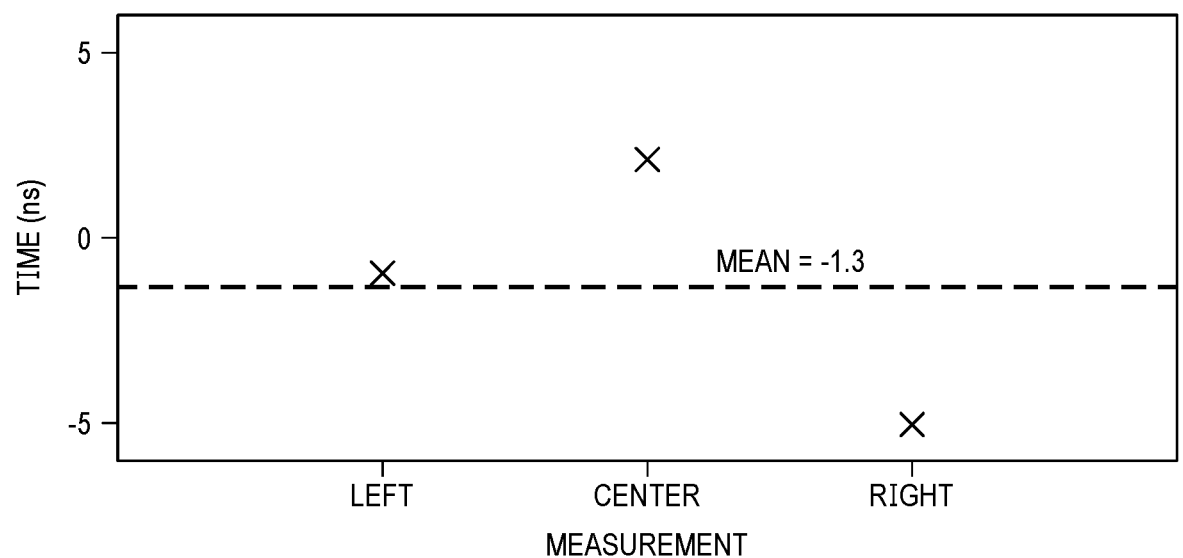
FIGS. 14A-14D illustrate a comparison of stress-free wave ToFs along the vertical and longitudinal direction from all measurement locations.
Figure 14B:
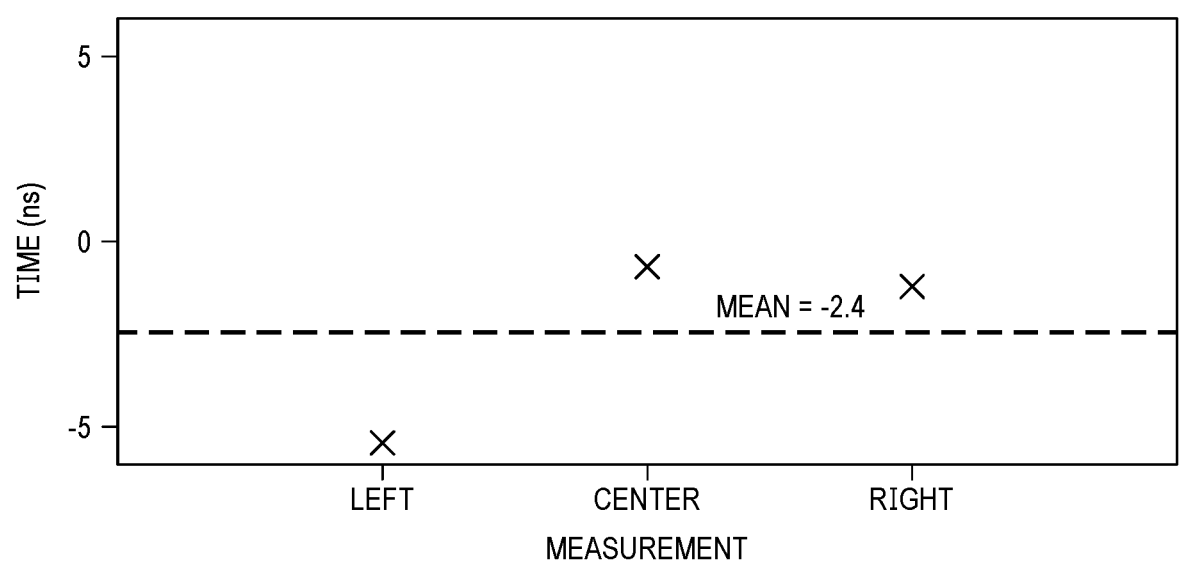
Figure 14C:
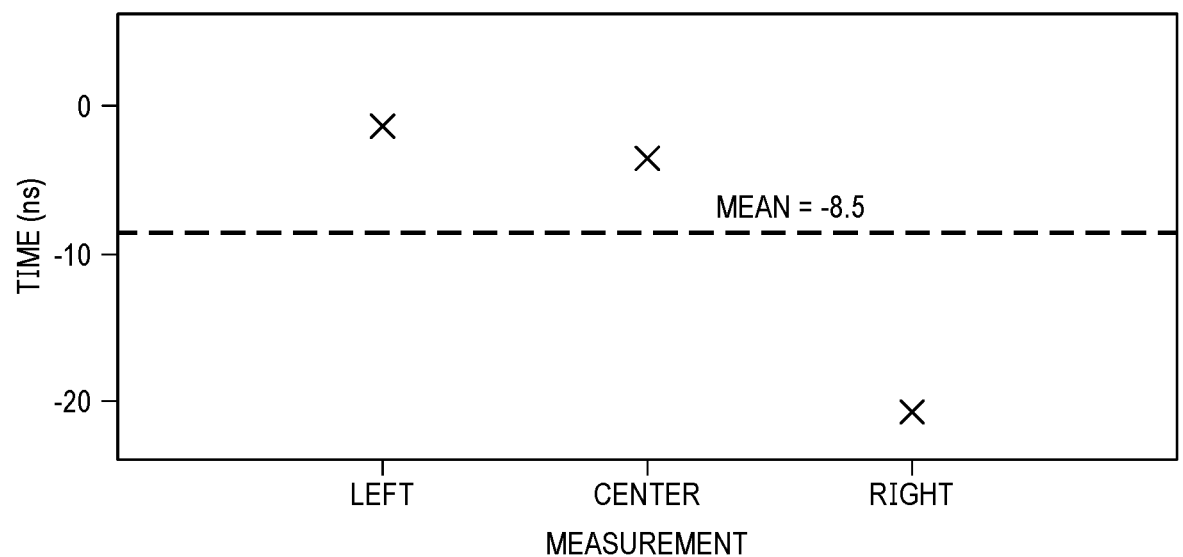
Figure 14D:
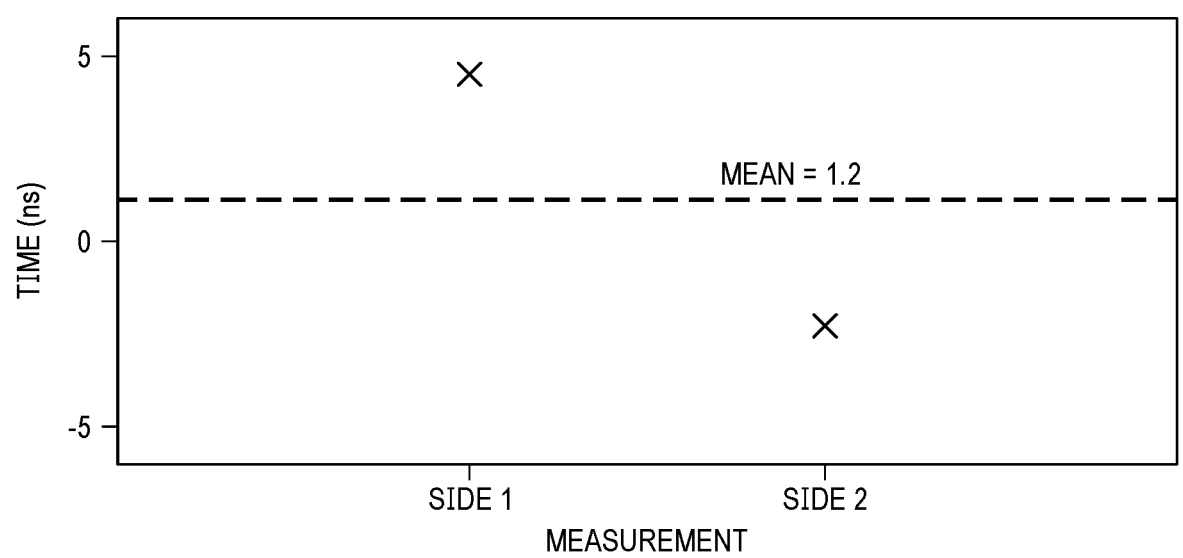

Stress-free ToF Comparison Between Two Directions—Stress-free ToF Comparison Results FIGS. 14A-14D illustrate a comparison of stress-free wave ToFs along the vertical and longitudinal direction from all measurement locations. Data shown in FIG. 14A are from the measurements taken on the first rail sample bottom, which has the flattest surface among all locations. As a result, the mean value of the differences is among the smallest (1.3 ns), which is close to its standard deviation obtained from the repeatability test. FIG. 14B shows the ToF differences from measurements taken on a polished foot surface of the first rail sample. A larger ToF difference mean value, 2.4 ns, indicates the effect of surface condition on the measurements. FIG. 14C shows the ToF differences from measurements taken on the less polished foot surface of the first rail sample, where a very larger difference (>20 ns) can be observed. Again, this large ToF difference is most likely caused by the surface condition, without which a similar ToF difference mean value can be obtained as that shown in FIG. 14B. Surprisingly, the ToF difference mean value shown in FIG. 14D is close to that shown in FIG. 14A. A reason might be that fewer data points are available, and the surface condition is more uniform in the raw rail sample.

SUMMARY OF RESULTS

In all, the data indicates that the stress-free LCR wave ToF along the rail longitudinal direction can be inferred from measurements along the vertical direction. Various methods can be used to further reduce any differences. For example, multiple measurements can be taken at the same location as well as at several locations along the rail, with statistical analysis. A priori information could be used, if available, from statistical measurements on rail tracks of the same material under no loading. Wedge design can be further refined by minimizing contact areas on the rail, and fixtures can be improved to provide more stable positioning. For field applications, finding areas on the rail that have uniform surface roughness may be important.

The invention claimed is:

1. A method of in situ measurement of an acoustoelastic constant (L) of a railway rail, comprising:
    using an ultrasonic wedge sensor to measure a stress-free (unloaded) time-of-flight ($t_0$) in the vertical direction of the rail, the wedge sensor having at least one receiver and one transmitter;
    applying a vertical load of known load value to the rail;
    while the vertical load is applied, using the ultrasonic wedge sensor to measure a stressed time-of-flight value;
    calculating the difference between the stress-free and the stressed time-of-flight to obtain a time-of-flight difference value ($\Delta t$); and
    based on the load value, the stress-free time-of-flight value, and the time-of-flight difference value, calculating the acoustoelastic constant, L.

2. The method of claim 1, wherein the rail is a flat bottom rail having a head, web, and foot.

3. The method of claim 1, wherein the using an ultrasonic wedge sensor step is performed by placing the wedge sensor on the rail web.

4. The method of claim 1, wherein the vertical load is selected to be below the yield stress of the material but to maximize the time-of-flight change.

5. The method of claim 1, wherein the wedge sensor transmitter has a center frequency from 2 to 3 MHz.

6. The method of claim 1, wherein the wedge sensor transmitter is configured to provide an incident angle between 20 to 30 degrees.

7. A method of in situ measurement of longitudinal stress in a railway rail, comprising:
- using an ultrasonic wedge sensor to measure a stress-free (unloaded) time-of-flight ($t_o$) in the vertical direction of the rail, the wedge sensor having at least one receiver and one transmitter;
- applying a vertical load of known load value to the rail;
- while the vertical load is applied, using the ultrasonic wedge sensor to measure a stressed time-of-flight value;
- calculating the difference between the stress-free time-of-flight value and the stressed time-of-flight value to obtain a time-of-flight difference value ($\Delta t$); and
- based on the load value, the stress-free time-of-flight value, and the time-of-flight difference value, calculating the acoustoelastic constant, L;
- using the ultrasonic wedge sensor or another ultrasonic wedge sensor to measure time-of-flight in the horizontal (longitudinal) direction; and
- based on the stress-free time-of-flight value, the acoustoelastic constant, L, and a time-of-flight difference value from the time-of-flight in the horizontal direction, calculating the longitudinal stress.

8. The method of claim 7, wherein the rail is a flat bottom rail having a head, web, and foot.

9. The method of claim 7, wherein the step of using an ultrasonic wedge sensor to measure a stress-free (unloaded) time-of-flight ($t_o$) in the vertical direction of the rail is performed by placing the wedge sensor on the rail web.

10. The method of claim 7, wherein the step of using an ultrasonic wedge sensor to measure a time-of-flight ($t_o$) in the horizontal direction of the rail is performed by placing the wedge sensor on the rail web.

11. The method of claim 7, wherein the step of using an ultrasonic wedge sensor to measure a time-of-flight ($t_o$) in the horizontal direction of the rail is performed by placing the wedge sensor on the rail foot.

12. The method of claim 7, wherein the vertical load is selected to be below the yield stress of the material but to maximize the time-of-flight change.

13. The method of claim 7, wherein the wedge sensor transmitter has a center frequency from 2 to 3 MHz.

14. The method of claim 7, wherein the wedge sensor transmitter is configured to provide an incident angle between 20 to 30 degrees.

15. A longitudinal rail stress measurement system, comprising:
- an ultrasonic wedge sensor having angled transducers that produce the required refraction of an ultrasonic wave for acquiring time-of-flight measurements in a railway rail;
- a load frame and actuator operable to apply a known load in the vertical direction to the rail; and
- a control and analysis system operable to perform the following tasks: to provide and receive ultrasonic signals from the wedge sensor, to calculate time-of-flight values in the rail unstressed in the vertical direction and stressed with the load in the vertical direction, and to calculate an acoustoelastic constant of the rail material based on the time-of-flight measurements.

16. The system of claim 15, wherein the control and analysis system is further operable to calculate time-of-flight in the rail in the horizontal direction, and to calculate longitudinal stress of the rail based on the time-of-flight measurements.

* * * * *